(12) United States Patent
Mehas et al.

(10) Patent No.: US 7,764,053 B2
(45) Date of Patent: Jul. 27, 2010

(54) SYSTEM AND METHOD TO CALCULATE INITIAL DUTY CYCLE

(75) Inventors: Gustavo James Mehas, Sunnyvale, CA (US); Wei Chen, Sunnyvale, CA (US); Bruce L. Inn, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 293 days.

(21) Appl. No.: 11/955,212

(22) Filed: Dec. 12, 2007

(65) Prior Publication Data

US 2009/0001946 A1 Jan. 1, 2009

Related U.S. Application Data

(60) Provisional application No. 60/869,924, filed on Dec. 14, 2006.

(51) Int. Cl.
G05F 1/652 (2006.01)
G05F 1/656 (2006.01)

(52) U.S. Cl. .................. 323/222; 323/282; 323/284; 323/901

(58) Field of Classification Search .................. 323/222, 323/282, 284, 285, 901
See application file for complete search history.

(56) References Cited

U.S. PATENT DOCUMENTS

| | | | | |
|---|---|---|---|---|
| 7,038,514 B2 * | 5/2006 | Leith et al. | ... | 327/198 |
| 7,161,336 B2 * | 1/2007 | Sakai et al. | ... | 323/271 |
| 7,265,679 B2 * | 9/2007 | Mosher | ... | 340/662 |

* cited by examiner

Primary Examiner—Bao Q Vu
(74) Attorney, Agent, or Firm—Howison & Arnott, L.L.P.

(57) ABSTRACT

A system and method for determining an initial duty cycle for startup of a voltage regulator involves generating a first current source responsive to an input voltage to the voltage regulator and generating a second current source responsive to an output voltage of the voltage regulator. A first capacitor is charged using the first current source responsive to a duty cycle of a PWM signal of the voltage regulator to a first voltage. A second capacitor is charged to a second voltage responsive to a period of the PWM signal of the voltage regulator. The initial duty cycle for startup of the voltage regulator is established as the duty cycle of the PWM signal when the first voltage is substantially equal to the second voltage.

23 Claims, 4 Drawing Sheets

SYSTEM AND METHOD TO CALCULATE INITIAL DUTY CYCLE

CROSS-REFERENCE TO RELATED APPLICATIONS

This application claims the benefit of U.S. Provisional Patent Application Ser. No. 60/869,924, filed on Dec. 14, 2006, entitled "METHOD TO CALCULATE INITIAL DUTY CYCLE", and is related to U.S. Pat. No. 7,034,589 issued on Apr. 25, 2006, entitled "Startup Circuit for Converter with Pre-biased Load" and U.S. Provisional Patent Application Ser. No. 60/869,923, filed Dec. 14, 2006, entitled "Method for Reduction of Inrush Currents at Startup in Voltage Mode Buck Regulators," each of which is incorporated herein by reference.

TECHNICAL FIELD

The present invention relates to the establishment of a duty cycle, and more particularly, to a system and method for establishing an initial duty cycle for startup of a voltage regulator.

BACKGROUND

The typical startup sequence of a pulse width modulation (PWM) DC to DC converter is to ramp the non-inverted or positive input of a feedback control error amplifier from zero volts to a target set point voltage level. The error amplifier is part of the feedback control loop which regulates an output voltage by comparing the reference voltage with a feedback signal based on a sensed portion of the output voltage. In an exemplary buck type converter, the PWM control circuitry provides a PWM signal which controls a gate driver, which further controls a switching device pair to convert an input voltage to the regulated output voltage. The switching device pair includes an upper switching device and a lower switching device which are typically implemented as a MOSFET pair.

If the converter is started up into a pre-biased load, such as when the output voltage is already charged, there can be large potentially damaging transient currents because the reference voltage is less than the feedback signal. In particular, since the feedback loop attempts to regulate the output voltage by comparing the voltage level of the feedback signal based on the output voltage with the reference voltage at the input of the error amplifier, where the feedback signal is already high and the reference voltage is ramping up at startup, the control circuit attempts to pull the output voltage lower by turning on the "pull down" output switching device (e.g., the lower device of the switching device pair). In this situation, the lower device can be turned on long enough to exceed its thermal limit. The surge currents can cause significant stress to on-chip components possibly resulting in catastrophic failure. In addition, these surge currents are "non-monotonicities" or variations in the output voltage which in some cases can cause downstream integrated circuits to latch up and fail.

Modern buck voltage regulator specifications require monotonic startup in the presence of pre-biased outputs. Monotonic startup is difficult in applications with pre-biased outputs as existing startup methods result in an average voltage across the output inductor that is not 0 volts which in turn causes current to build up in the inductor according to the equation $DV=L*DI/DT$. This build up of current in the conductor causes a non-monotonicity on the output voltage of the regulator as the control loop stabilizes.

To mitigate this problem previous prior art has utilized an accurate analog multiplier architecture, which requires a BICMOS process to identify an initial PWM duty cycle whose purpose is to make the average voltage across the output inductor equal to 0 volts. A CMOS process may also be used but will have a much lower quality. This requires the use of BJT's to implement a Gilbert Multiplier. Implementing this in various products using various types of processes is difficult as these processes frequently do not have the types of transistors necessary to design an analog multiplier of the requisite accuracy. Additionally, the design must allow for operation over a wide operating frequency and input/output voltage ranges. Other previous art utilizes simple less effective solutions including startup after two PWM pulses (effectively at 1% duty cycle), startup at 50% duty cycle, or operating the regulator non-synchronously to prevent negative current in the inductor. These methods have several drawbacks and are inferior solutions to that described herein below.

SUMMARY

The present invention, as disclosed and described herein, in one aspect thereof, comprises a system and method for determining an initial duty cycle for startup of a voltage regulator. First and second current sources are generated wherein the first current source is generated responsive to an input voltage of the voltage regulator and the second current source is generated responsive to an output voltage of the voltage regulator. A first capacitor is charged to the first voltage using the first current source. The charging of the first capacitor is responsive to a duty cycle of a PWM signal of the voltage regulator. A second capacitor is charged to a second voltage using the second current source. The charging of the second capacitor is done responsive to a period of the PWM signal of the voltage regulator. The initial duty cycle for start up of the voltage regulator is established as the duty cycle of the PWM signal being applied to the first capacitor when the first voltage is substantially equal to the second voltage.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Although the preferred embodiment has been described in detail, it should be understood that various changes, substitutions and alterations can be made therein without departing from the spirit and scope of the invention as defined by the appended claims.

Figure 1:
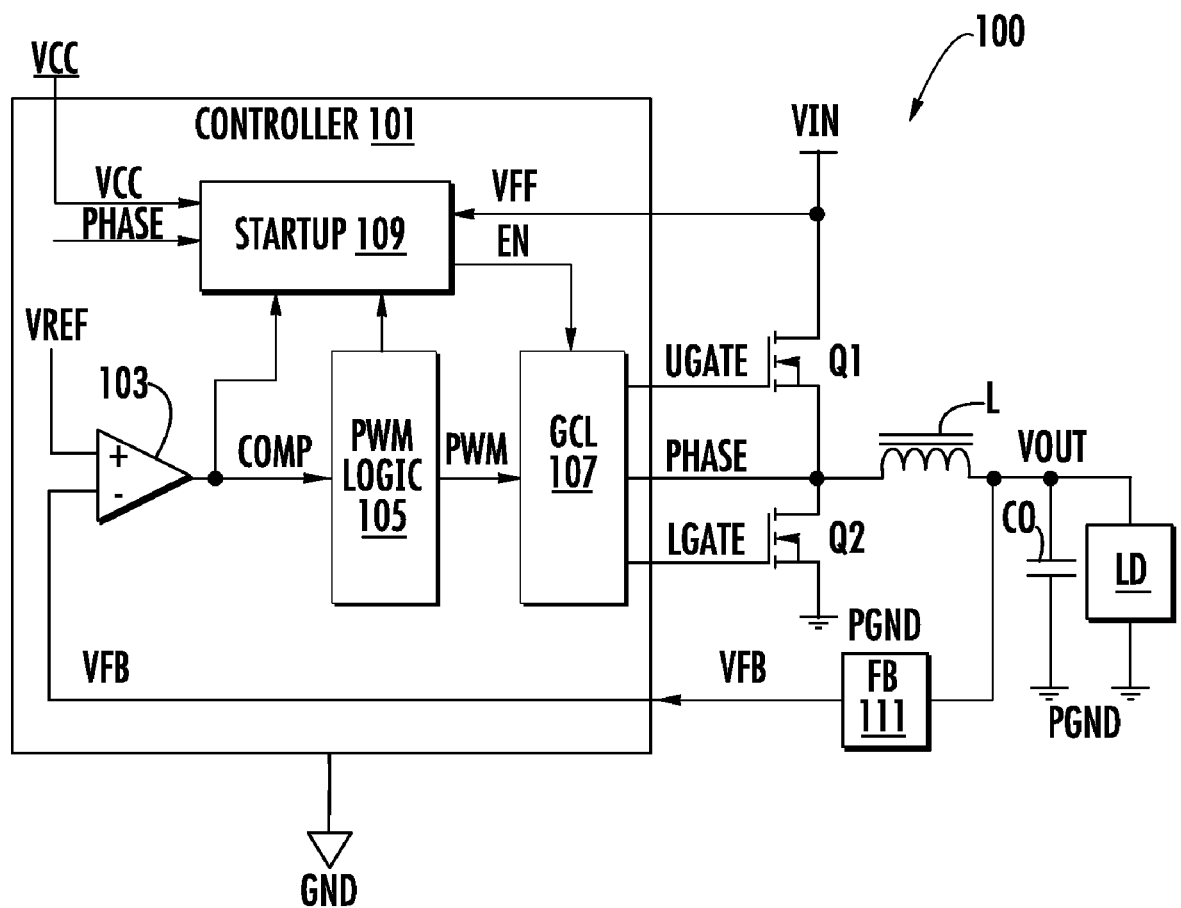
FIG. 1 is a block diagram of a DC to DC converter including a circuit enabling establishment of the initial duty cycle for startup.

FIG. 1 is a simplified schematic and block diagram of a DC to DC converter 100 including a startup circuit 109 for establishing the initial duty cycle of the voltage regulator. The DC to DC converter 100 is shown as a buck type converter for purposes of illustration, although it is understood that the present invention is equally applicable to other types of power converters. A pair of switches, Q1 and Q2, are coupled in series between respective terminals of an input source voltage, shown as VIN, and power ground (PGND). In the embodiment shown, the switches Q1 and Q2 are implemented in channel metal oxide semiconductor, field effect transistors (MOSFETs), although other types of electronic switches are contemplated including semiconductor switches suitable for integrated circuit (IC) fabrication. The upper switch Q1 has its drain coupled to VIN, its gate receiving an upper gate control signal UGATE, and its source coupled to the drain of the lower switch Q2 at a PHASE node PHASE developing a PHASE signal. A node and the signal it develops are referred to herein as the same unless otherwise specified. The lower switch Q2 having its drain coupled to PHASE, receives a lower gate control signal LGATE at its gate and has its source coupled to PGND. The PHASE node is coupled through an output inductor L to an output node that develops an output signal VOUT. The VOUT signal is applied to a load LD and an output capacitor CO both referenced to ground. The VOUT signal is fed back through a feedback (FB) circuit 111 as a feedback voltage signal (VFB) to a controller 101, which outputs the UGATE and LGATE signals to control operation of switches Q1 and Q2. The PHASE node is also provided to the controller 101 for various purposes, including over current detection.

The controller 101 includes an error amplifier 103, PWM logic 105, gate control logic (GCL) 107 and the startup circuit 109 for establishing the initial duty cycle. In typical configurations, the error amplifier 103 senses VOUT via the VFB signal or a voltage sensed signal (not shown) or other means, and generates a compensation signal COMP provided at its output to the PWM logic 105. As shown, VFB is provided to the inverting input of the error amplifier 103 within the controller 101, although alternative methods are contemplated for sensing the output. The PWM logic 105 includes an oscillator or the like (not shown) which generates a reference oscillation wave form and a PWM comparator which compares the reference wave form with the COMP signal to generate a PWM wave form provided to the GCL 107. Based on the PWM signal, the GCL 107 asserts the UGATE signal high to turn on the switch Q1 and asserts the LGATE signal low to turn off the switch Q2 to couple VIN through the output inductor L to drive the voltage level of VOUT. The GCL 107 then asserts the UGATE signal low and the LGATE signal high to turn off Q1 and turn on Q2. Operation toggles in this manner based on the duty cycle of the PWM signal. This duty cycle is established by the startup circuit 109 responsive to the monitored input voltage via the VFF node, the monitored PHASE voltage via the PHASE node and the applied PWM signals from the PWM logic 105.

A typical startup sequence is to ramp the reference signal provided to the non-inverting input of the error amplifier 103 from zero to a set point voltage level. If VOUT is already pre-charged, such as by the load LD or by the DC to DC converters, the VFB signal is already high and the error amplifier 103 pulls COMP low. The PWM logic responds by producing the PWM signal at a relatively low duty cycle causing the GCL 107 to activate the lower switch Q2 for a substantial period of time in an attempt to reduce VOUT. Thus, the switch Q2 is coupled between ground and the pre-charged VOUT signal through the inductor L for a sufficiently long enough period of time, potentially exceeding its thermal limit. In general, if the average voltage across the inductor L is not zero, surge currents are generated which potentially cause damage to the DC to DC converter 100 (e.g., the switch Q2) or to components in the load LD.

The startup circuit 109 is provided to establish the initial duty cycle in order to prevent this undesirable situation by maintaining the voltage across the inductor L at zero during startup. The startup circuit 109 provides an enable signal to the GCL 107 to effectively enable and disable output switching. The GCL 107 would be enabled once the initial duty cycle for startup had been established. The controller 101 receives power via a VCC signal referenced to a common power supply terminal or signal ground (GND) where the VCC signal is provided to the startup circuit 109. The controller 101 includes a voltage feed forward (VFF) pin internally coupled to the startup circuit 109, where VFF is externally coupled to the VIN signal. The PHASE signal and the COMP signal are provided to the startup circuit 109, which monitors operation of the error amplifier 103 via the COMP pin to determine when it is appropriate to assert the VIN signal to enable output switching in order to reduce or otherwise eliminate undesired surge currents. The duty cycle startup circuit 109 generates two current sources based upon the input voltage VIN and the output voltage VOUT. The resulting current sources are integrated by charging two equal value capacitors (CVIN and CVOUT) for different lengths of time as determined by an input PWM signal provided by the PWM logic 105 that has a specific period duty cycle. This integration is derived from the integration that occurs across the output inductor L during normal PWM operation. The PWM signal's duty cycle is varied until the two capacitor voltages are equal, at which point the input PWM duty cycle is used as the initial PWM duty cycle for the regulator at start up. This is a sampling system requiring a reset pulse to zero the voltage on both integration capacitors at the end of the sample period. The details of the implementation are described more specifically with respect to FIG. 2 herein below.

The GCL 107 includes a pair of output drivers (not shown) that drive the gates of the switches Q1 and Q2 based on the PWM signal as known to those skilled in the art. Also, the GCL 107 typically includes shoot through protection logic or the like that ensures only one of the switches Q1 and Q2 is on at any given time. When the enable signal is asserted high, the GCL operates as normal and when the enable signal is asserted low, the GCL turns both of the switches Q1 and Q2 off to disable output switching. In one embodiment, for example, the GCL 107 disables both the output drivers so that the UGATE and LGATE signals are both asserted low and remain low while the enable signal is asserted low. Internal and external embodiments of the GCL 107 are contemplated. An external gate driver IC, for example, may be configured with an enable input that receives the enable signal or a version thereof. In some embodiments, the GCL 107 tri states its outputs in response to the enable signal going low and a separate driver IC (not shown) incorporating the switches Q1 and Q2 detects the tri state condition and disables itself. The present invention is not limited to any specific embodiment or configuration of the GCL 107 or the switching devices.

Figure 2:
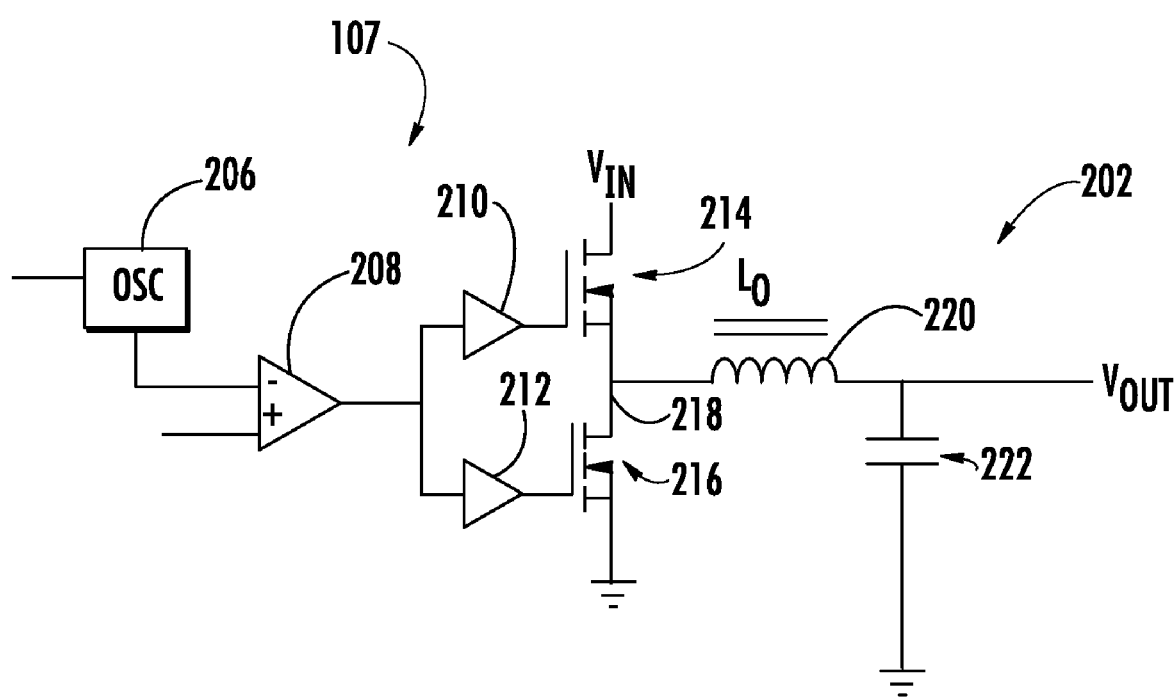
FIG. 2 is a schematic block diagram of a voltage regulator with a PWM converter circuit.

Referring now to FIG. 2, there is illustrated a buck converter regulator with included PWM logic 105 and gate control logic 107 as discussed in FIG. 1. PWM comparator 208 has the output of the error amplifier 103 applied to its positive input and its negative input connected to receive an input from oscillator 206. The output of the oscillator 206 is a triangular wave form. The output of the PWM comparator 208 is applied to driver circuits 210 and 212 within the GCL circuitry 107, which drive the gates of the transistors 214 and 216 respectively. This circuitry provides a pulse width modulated wave form with an amplitude of $V_{in}$ at a PHASE node 218 connected to a first side of inductor 220. The PWM wave form provided from PHASE node 218 is smoothed by an output filter consisting of inductor 220 and capacitor 222. The FB pin impedance 111 comprises a compensation feed back loop for the error amplifier 103.

Figure 3:
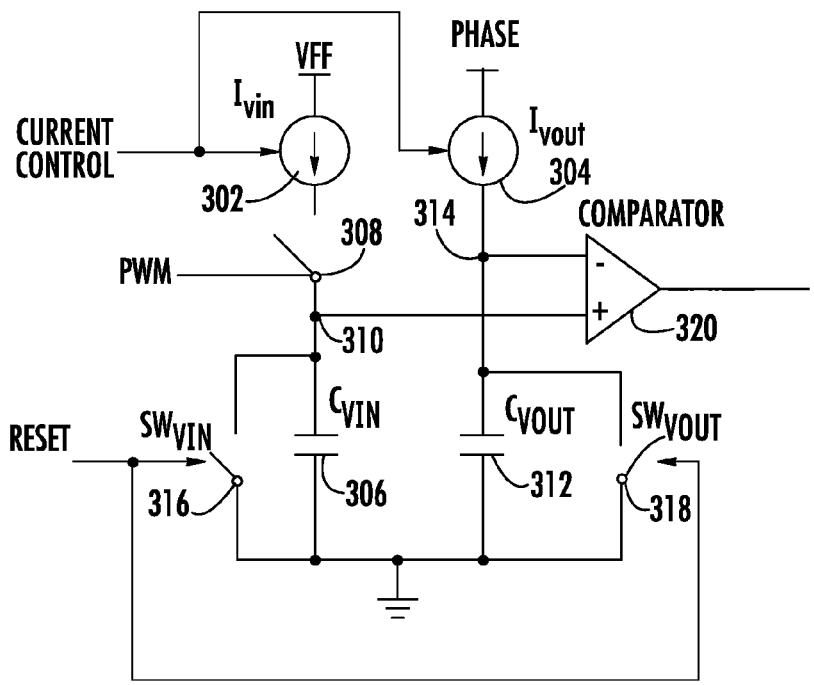
FIG. 3 is a schematic block diagram of the circuit for determining a duty cycle at startup of a voltage regulator.

Referring now to FIG. 3, there is more fully illustrated the portion of the startup circuitry 109 used to determine the initial duty cycle for the voltage regulator of FIG. 1. Current control signals are provided to current sources 302 and 304 respectively. To generate the first current source IVIN 302, a voltage to current algorithm is performed represented by IVIN=K×V_FF. In this application, the input voltage VIN is measured at the VFF pin of the controller 101, VIN's measurement location can of course be varied depending on the particular application.

Figure 4:
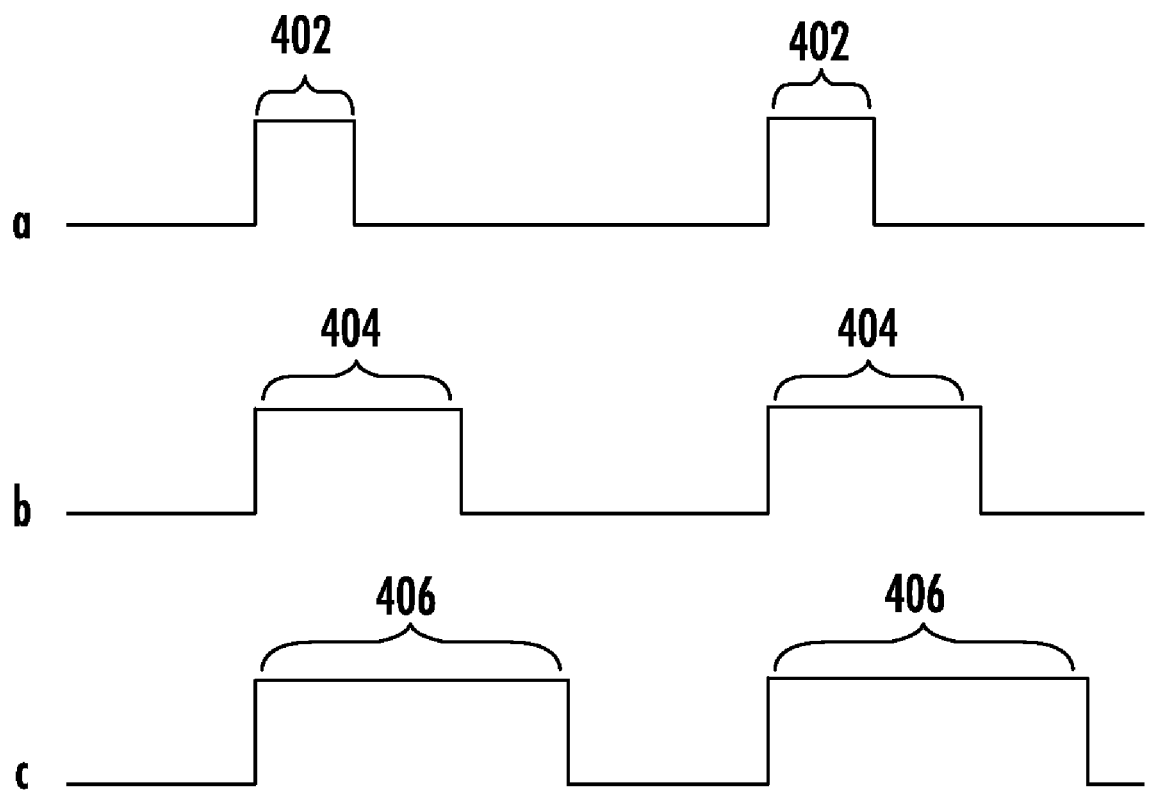
FIG. 4 illustrates the manner in which the pulse width of the PWM signal is increased for determining the initial duty cycle within the circuit of FIG. 3.

IVIN is used to charge its matched integrated capacitor 306 (CVIN) which is connected to the current source 302 through a switch 308 between the current source 302 and the integration capacitor 306. One end of capacitor 306 is connected to node 310 and the other end of capacitor 306 is connected to ground. The switch 308 is opened and closed responsive to a PWM input signal provided by the PWM logic 105. IVIN is used to charge the matched integration capacitor CVIN 306 for a period of time determined by the width of the input PWM pulse responsive to opening and closing of switch 308. The PWM pulse can be generated in several ways, in this implementation the normal PWM pulse generated by a voltage mode control loop during the soft start process is used. This provides for a PWM pulse that slowly increases from a duty cycle of 0% to a duty cycle of 100% as illustrated in FIG. 4.

At A, the PWM pulse has a first pulse width 402. It can be seen that as the duty cycle increases from A to B, the pulse width 404 within B is larger than that of the pulse width 402 in A. As the duty cycle continues to increase from B to C, the pulse width 406 in C is greater than that of the pulse width 404 in line B. As this is a sampling system, the rate at which the PWM signal pulse width changes has a direct impact on the accuracy of the measurement. If the PWM pulse widths increase too quickly, the system will not have an accurate sampling due to well known quantization effects. In typical applications, this is not an issue as start up times are long as compared with the operating frequency of the regulator. The described method to vary the PWM signal is simple open loop implementation, more complex closed loop methods of determining the PWM pulse are also possible.

Referring now back to FIG. 3, the second current source IVOUT 304 is proportional to the output voltage VOUT as represented by the voltage on the PHASE node of the controller 101. This approximation is appropriate as at startup both the high side and low side switching transistor MOSFETs are "off" so that the voltage on the PHASE pin is equal to VOUT as the series impedance between PHASE and VOUT of the output inductor is a very small impedance (effectively a short) at low frequencies (DC). In this implementation the voltage to current algorithm, IVOUT equals K×V_VPHASE, utilizes the same conversion constant K for each current source 302 and 304. However, more complex loops can be implemented that would treat the current sources 302 and 304 as independent variables. Current source IVOUT 304 charges its matched integrating capacitor 312 for the entire period of the PWM pulse as described by the mathematical analysis herein below. The capacitor CVOUT 312 is located between node 314 connected to the current source 304 and ground.

The capacitors 306 and 312 are reset at the end of each period of the PWM signal by applying a reset pulse to switches 316 and 318. Switch 316 is connected across capacitor 306 between node 310 and ground. Switch 318 is connected across capacitor 312 between node 314 and ground. When switches 316 and 318 are closed, the charges across capacitors 306 and 312 are discharged to ground enabling them to be recharged by current sources 308 and 304 during the next period of the PWM signal.

A comparator 320 performs a comparison of the voltages charged onto capacitors 306 and 312. The negative input of comparator 320 is connected to capacitor 312 at node 314. The positive input of comparator 320 is connected to the capacitor 306 at node 310. At the end of the PWM signal's period, the voltages on the two integrating capacitors 306 and 312 are compared to each other by the comparator 320. If the two voltages are equal, the volt seconds across the inductor 220 are balanced, and the PWM pulse duty cycle that generated this condition is the optimal PWM pulse duty cycle for pre-biased startup. The startup circuit 109 may then enable the gate control logic 102 such that the gate control logic 107 can be controlled by the PWM signal provided by the PWM logic 105 having the associated duty cycle.

In this implementation, the circuitry simply checks to see if the voltage on capacitor CVIN 306 is larger than the voltage on the capacitor CVOUT 312. At the end of each comparison of the voltage on the capacitors 306 and 312 by the capacitor 320, the switches 316 and 318 are closed to reset the capacitors 306 and 312 to zero volts to allow for the next measurement calculations. Once the voltage on CVIN 306 is equal to or larger than the voltage on CVOUT 312, the regulator's drivers are enabled by providing an enable signal from the start up circuit 109 to the GCL logic 107. The resulting initial PWM wave form to a first order approximation balances the voltage across the output inductor 220 resulting in monotonic startup into pre-biased loads as compared to previous startup methodologies.

The magnitude of the voltage on each capacitor 306 and 312 is directly proportional to the switching frequency of the voltage regulator. The switching frequency can change by a factor of 10 and at extremely high frequencies, the resulting voltages on the integration capacitors 306 and 312 can be very small. Offset error in the voltage comparator 320 begins to limit the accuracies of the circuit. This problem can be compensated for by altering the magnitude of the charging currents 302 and 304, or altering the magnitude of the integration capacitors 306 and 312 in order to bring the voltage levels on the capacitors 306 and 312 to sufficiently large values such that the comparator 320 offset is no longer a dominant factor in the accuracy of the circuit. The magnitude of the current sources 302 and 304 may be altered responsive to the current control signals applied thereto. The altering of the magnitude of the capacitors 306 and 312 can be performed by including a number of capacitors for each of the capacitors CVIN and CVOUT which are connected together in parallel between nodes 310 and ground and between nodes 314 and ground respectively. Switches may switch differing magnitude capacitors between the respective current sources and ground as necessary based upon the switching frequency.

The choice of integration times is based upon the basic physics of the buck regulator system. Different topologies may require a modification to the integration times. In a buck regulator system, the times are determined by the requirement that the output inductor 220 have no DC current flowing therethrough at startup. This is true when the average voltage on the PHASE side of the inductor 220 is equal to the average voltage on the VOUT side of the inductor 220. For this analysis, the average voltage on the VOUT side of the inductor is assumed to be constant at VOUT. The calculation assumes that the voltages VIN and VOUT do not change significantly as compared with the time it takes for the circuit to complete a sample. The circuit can be modified to compensate for this modification. The average voltage on the PHASE side of the inductor 220 is determined by the duty cycle V. This simple model neglects parasitic losses so that the governing equation is:

$$D = VOUT/VIN$$

A more complex model not put forward but seen as an obvious alternative implementation would take into account losses in the system and other second order affects. The governing equation for the inductor states that the voltage across the inductor is equal to the inductance of the inductor multiplied by the time rate change of the current.

$$DV = LDI/DT$$

For zero net current flow in the inductor at start-up into a pre biased load, the above equation must be balanced for both states of the PHASE node, namely when it is at VIN and at ground. PHASE is at ground for the period (T) less the period of time PHASE is high D×T. The voltage across the inductor during this time is ground (GND)—VOUT, meaning that DI/DT of the inductor is negative. Solving this we obtain;

$$T \times (1-D) \times (GND - VOUT)/L = DIDT$$

This must be balanced with the time PHASE is high, or D×T, during this time the voltage across the inductor is VIN−VOUT. The rate of change of current:

$$DI/DT = T \times D \times (VIN - VOUT)/L$$

The two equations must sum to zero for a balanced inductor, in which case the L cancels. Assuming GND is zero volts and if VOUT is moved to the opposite side, then:

$$D \times VIN - D \times VOUT = VOUT$$

Adding D×VOUT to both sides of the equation we obtain:

$$T \times D \times VIN = T \times VOUT$$

Which is exactly the duty cycle equation D=VOUT/VIN if we divide through by the period T.

Alternatively, the equation can be manipulated to derive the calculation. If a V2I substitution into the equation where:

$$IVIN = K \times VIN; \text{ where } IVOUT = K \times VOUT$$

We find that;

$$T \times D \times IVIN/K = T \times IVOUT/K$$

T×IVOUT/K has units of charge. In order to measure this charge, a capacitor is used to accumulate the charge by Q=CV, V_CVOUT and V_CVIN is equal to;

$$T \times IVOUT/K \times CVOUT; \text{ and}$$

$$T \times DIVIN/K \times CVIN$$

Solving for the above equations we find that for the initial duty cycle and identical V2I conversions (K) and identical integration capacitors (CVIN and CVOUT) the final voltage will be equal, which is consistent with the desired outcome.

Figure 5:
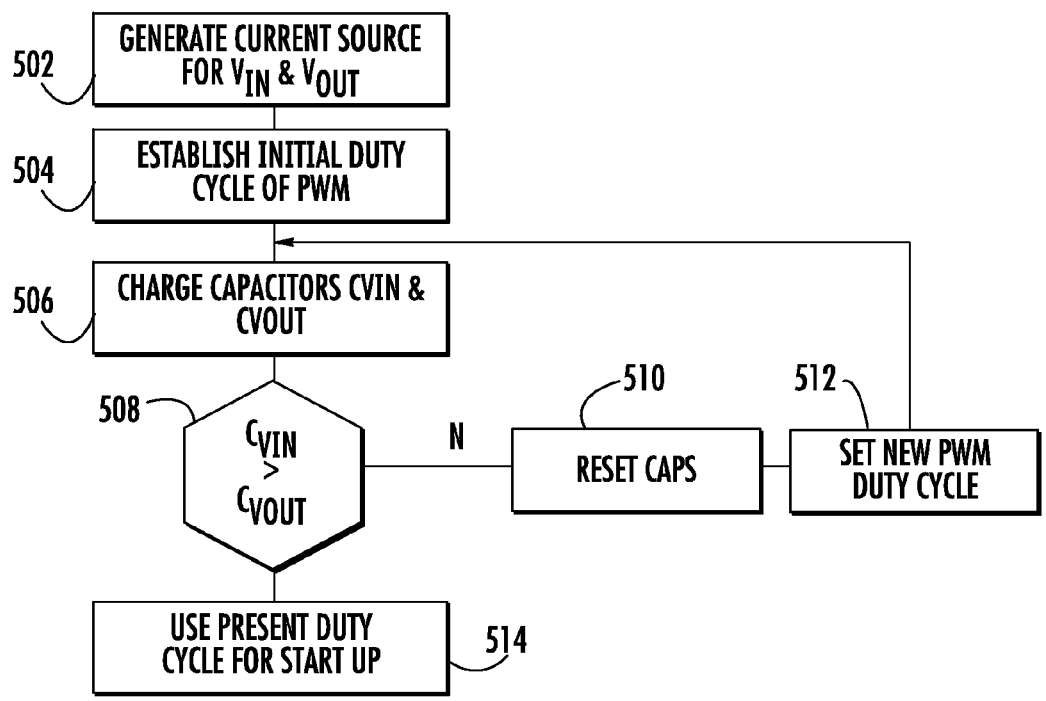
FIG. 5 is a flow diagram illustrating the process for determining the duty cycle at startup of the voltage regulator.

Referring now to FIG. 5, there is illustrated a flow diagram describing the operation of the method for determining the initial duty cycle. Initially, at step 502 a pair of current sources are generated responsive to the measured input voltage $V_{in}$ and the measured output voltage $V_{out}$ for the voltage regulator. Next, an initial duty cycle of the PWM signal is established at step 504. Each of the capacitors CVIN and CVOUT are charged at step 506. Capacitor CVIN is only charged for a portion of the period of the PWM signal responsive to the pulse width of the PWM signal that is dependent upon its duty cycle. The CVOUT capacitor is charged by its current source for the entire period of the PWM signal. Next, at inquiry step 508 a determination is made if the voltage stored on capacitor CVIN is greater than or equal to the voltage on capacitor CVOUT. If not, the capacitors are reset to zero volts at step 510 by a reset signal, and a new PWM duty cycle is established at step 512. Control then returns back to step 506 to again charge the capacitors CVIN and CVOUT. However, if inquiry step 508 determines that the voltage on the capacitor CVIN is greater than or equal to the voltage on the capacitor CVOUT, the present duty cycle of the PWM signal is used for startup at step 512, and the driver circuits for the switching transistors of the voltage regulator are enabled.

Using the above described system and method an initial duty cycle based upon an input and output voltage of a voltage regulator may be determined for monotonic startup into pre-biased loads. The circuit monitors the buck regulator's input voltage and output voltage which are provided as inputs to matched voltage controlled current sources. The resulting current sources are integrated into matched capacitors. The integration time of the current source IVOUT is equal to one sample period. The integration time of the current source IVIN is a fraction of one sample period as determined by the input PWM signal duty cycle. When the voltages on the integrating capacitors are equal, the input duty cycle represents the initial duty cycle to allow for average voltage across the output inductor that is approximately zero volts. This method balances the volt seconds across the output inductor utilizing the basic properties of capacitors and current sources. This enables for startup into a pre-biased load that will be approximately monotonic. An additional improvement to the described circuitry adjusts the integration time constant as a function of the operating frequency. This could be extended to a function of other variables in the system including input and output voltages. As reduced to practice, the voltage to current conversion gain is adjusted to provide this functionality. There are other ways to provide the same functionality including varying the size of the integration capacitors.

It will be appreciated by those skilled in the art having the benefit of this disclosure that this method to calculate initial duty cycle provides an improvement over existing systems and methods. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for determining an initial duty cycle for startup of a voltage regulator, comprising the steps of:

generating a first current source responsive to an input voltage to the voltage regulator;

generating a second current source responsive to an output voltage of the voltage regulator;
charging a first capacitor using the first current source responsive to a duty cycle of a PWM signal of the voltage regulator to a first voltage;
charging a second capacitor using the second current responsive to a period of the PWM signal of the voltage regulator to a second voltage; and
establishing the initial duty cycle for startup of the voltage regulator as the duty cycle of the PWM signal when the first voltage is substantially equal to the second voltage.

2. The method of claim 1, wherein the step of establishing further comprises the step of:
comparing the first voltage to the second voltage; and
establishing a present duty cycle of the PWM signal as the initial duty cycle if the first voltage is substantially equal to or greater than the second voltage.

3. The method of claim 1, wherein the step of establishing further comprises the steps of:
comparing the first voltage to the second voltage;
resetting a voltage on each of the first capacitor and the second capacitor to ground if the first voltage is less than the second voltage;
charging the first capacitor using the first current source responsive to a next duty cycle of the PWM signal of the voltage regulator to the first voltage;
charging the second capacitor using the second current source responsive to the period of the PWM signal of the voltage regulator to the second voltage;
establishing the initial duty cycle for startup of the voltage regulator as the next duty cycle of the PWM signal when the first voltage is substantially equal to the second voltage.

4. The method of claim 1, wherein the step of generating a first current source further comprises the steps of:
altering a magnitude of the first current source responsive to a switching frequency of the voltage regulator; and
altering a magnitude of the second current source responsive to the switching frequency of the voltage regulator.

5. The method of claim 1, further including the step of altering a magnitude of the first capacitor and the second capacitor responsive to a switching frequency of the voltage regulator.

6. The method of claim 1, wherein the step of generating the first current source further comprises the step of measuring the input voltage at a VFF pin of the voltage regulator.

7. The method of claim 1, wherein the step of generating the second current source comprises the step of measuring the output voltage at a PHASE pin of the voltage regulator.

8. A voltage regulator, comprising:
a pair of switching transistors;
an output filter connected to the pair of switching transistors;
gate control logic for driving the pair of switching transistors responsive to a PWM signal;
PWM logic for generating the PWM signal; and
control circuitry for selecting an initial duty cycle of the PWM signal at startup responsive to an input voltage and the output voltage, wherein the control circuitry further comprises:
a first current source generating a first current responsive to an input voltage to the voltage regulator;
a second current source generating a second current responsive to an output voltage of the voltage regulator;
a first capacitor charging to a first voltage using the first current source responsive to a duty cycle of a PWM signal of the voltage regulator;
a second capacitor charging to a second voltage using the second current responsive to a period of the PWM signal of the voltage regulator; and
a comparator generating an output responsive to a comparison of the first voltage and the second voltage; and
wherein the comparator generates an output indicating the duty cycle should be established as the initial duty cycle for startup when the first voltage is substantially equal to the second voltage.

9. The voltage regulator of claim 8, wherein the comparator generates a second output indicating recharging of the first capacitor responsive to a next duty cycle of the PWM signal of the voltage regulator and recharging the second capacitor responsive to the period of the PWM signal of the voltage regulator.

10. The voltage regulator of claim 8 further including switch connected between the first current source and the first capacitor for connecting the first current source to the first capacitor responsive to an applied PWM signal.

11. The voltage regulator of claim 8 further including:
a first reset switch connected across the first capacitor discharging the first voltage on the first capacitor responsive to a reset signal; and
a second reset switch connected across the second capacitor discharging the second voltage on the second capacitor responsive to the reset signal.

12. The voltage regulator of claim 8, wherein a magnitude of the first current source is altered responsive to a switching frequency of the voltage regulator, and further wherein a magnitude of the second current source is altered responsive to the switching frequency of the voltage regulator.

13. The voltage regulator of claim 8, wherein a magnitude of the first capacitor and the second capacitor are altered responsive to switching frequency of the voltage regulator.

14. The voltage regulator of claim 8, wherein the first current source is responsive to a measured input voltage at a VFF pin of the voltage regulator.

15. The voltage regulator of claim 8, wherein the second current source is responsive to a measured output voltage at a PHASE pin of the voltage regulator.

16. A circuit for determining an initial duty cycle for startup of a voltage regulator, comprising;
a first current source generating a first current responsive to an input voltage to the voltage regulator;
a second current source generating a second current responsive to an output voltage of the voltage regulator;
a first capacitor charging to a first voltage using the first current source responsive to a duty cycle of a PWM signal of the voltage regulator;
a second capacitor charging to a second voltage using the second current responsive to a period of the PWM signal of the voltage regulator; and
a comparator generating an output responsive to a comparison of the first voltage and the second voltage; and
wherein the comparator generates an output indicating the duty cycle should be established as the initial duty cycle for startup when the first voltage is substantially equal to the second voltage.

17. The circuit of claim 16, wherein the comparator generates a second output indicating recharging of the first capacitor responsive to a next duty cycle of the PWM signal of the voltage regulator and recharging the second capacitor responsive to the period of the PWM signal of the voltage regulator.

18. The circuit of claim 16 further including switch connected between the first current source and the first capacitor for connecting the first current source to the first capacitor responsive to an applied PWM signal.

19. The circuit of claim 16 further including:
- a first reset switch connected across the first capacitor discharging the first voltage on the first capacitor responsive to a reset signal; and
- a second reset switch connected across the second capacitor discharging the second voltage on the second capacitor responsive to the reset signal.

20. The circuit of claim 16, wherein a magnitude of the first current source is altered responsive to a switching frequency of the voltage regulator, and further wherein a magnitude of the second current source is altered responsive to the switching frequency of the voltage regulator.

21. The circuit of claim 16, wherein a magnitude of the first capacitor and the second capacitor are altered responsive to switching frequency of the voltage regulator.

22. The circuit of claim 16, wherein the first current source is responsive to a measured input voltage at a VFF pin of the voltage regulator.

23. The circuit of claim 16, wherein the second current source is responsive to a measured output voltage at a PHASE pin of the voltage regulator.

* * * * *

UNITED STATES PATENT AND TRADEMARK OFFICE
CERTIFICATE OF CORRECTION

| | | |
|---|---|---|
| PATENT NO. | : 7,764,053 B2 | Page 1 of 1 |
| APPLICATION NO. | : 11/955212 | |
| DATED | : July 27, 2010 | |
| INVENTOR(S) | : Gustavo James Mehas, Wei Chen and Bruce L. Inn | |

It is certified that error appears in the above-identified patent and that said Letters Patent is hereby corrected as shown below:

In column 3, line 11 delete "in channel", and insert therefor --N-channel--.
In column 6, line 24 delete "102", and insert therefor --107--.

Signed and Sealed this
First Day of February, 2011

David J. Kappos
*Director of the United States Patent and Trademark Office*